(12) United States Patent
Abdoh

(10) Patent No.: US 6,792,087 B2
(45) Date of Patent: Sep. 14, 2004

(54) SCHEDULING SYSTEM

(76) Inventor: Ahmed Abdoh, P.O. Box 1769, Winnipeg, Manitoba (CA), R3C 2Z9

( * ) Notice: Subject to any disclaimer, the term of this patent is extended or adjusted under 35 U.S.C. 154(b) by 0 days.

(21) Appl. No.: 10/247,717

(22) Filed: Sep. 20, 2002

(65) Prior Publication Data
US 2003/0053607 A1 Mar. 20, 2003

Related U.S. Application Data
(60) Provisional application No. 60/323,370, filed on Sep. 20, 2001.

(51) Int. Cl.$^7$ ............................................ H04M 11/00
(52) U.S. Cl. ................ 379/90.01; 379/88.18; 705/9
(58) Field of Search .................. 379/88.16–88.18, 379/93.07, 93.17, 93.23, 112.01, 114.01, 114.03, 210.01, 90.1; 705/1–2, 8–9; 600/300; 128/897; 709/204

(56) References Cited

U.S. PATENT DOCUMENTS

| | | | | |
|---|---|---|---|---|
| 5,289,531 A | * | 2/1994 | Levine | .................... 379/93.23 |
| 5,692,125 A | * | 11/1997 | Schloss et al. | ................. 705/9 |
| 5,872,841 A | * | 2/1999 | King et al. | ............ 379/210.01 |
| 5,982,863 A | * | 11/1999 | Smiley et al. | ........... 379/88.18 |
| 6,363,351 B1 | * | 3/2002 | Moro | ............................. 705/1 |
| 6,389,454 B1 | * | 5/2002 | Ralston et al. | .............. 709/204 |

* cited by examiner

Primary Examiner—George Eng
(74) Attorney, Agent, or Firm—Michael R. Williams; Adrian D. Battison; Ryan W. Dupuis

(57) ABSTRACT

A scheduling system which is arranged for automated schedule entry, revision and reporting is described.

6 Claims, 1 Drawing Sheet

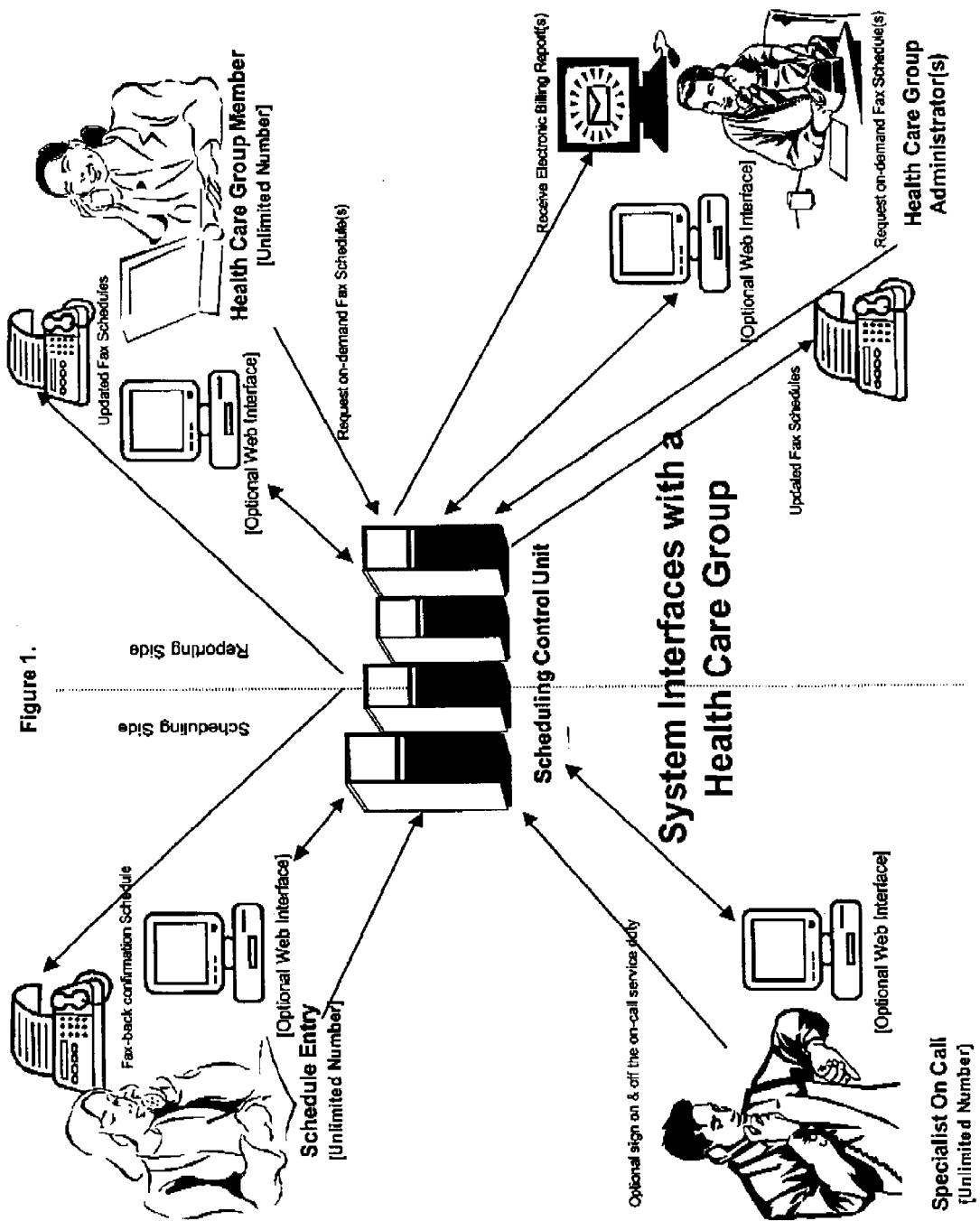

SCHEDULING SYSTEM

This application claims priority under 35 USC § 119(e) to Provisional Patent Application Serial No. 60/323,370 filed on Sep. 20, 2001.

BACKGROUND OF THE INVENTION

One of the problems faced by hospital groups in metropolitan areas relates to the coordinating of schedules of specialists. Specifically, in order to be more efficient, multiple hospitals within a geographic area may share specialists. As a result, it is necessary to inform each of the hospitals who is on call for each speciality at a given time. In most cases, this is done by couriering manually updated lists to each hospital. As will be appreciated, this method is slow, laborious and time-consuming. Furthermore, other aspects of this system, for example, changes to scheduling, tracking of calls and billing, are very difficult to manage.

U.S. Pat. No. 5,289,531 teaches an electronic scheduler for rescheduling appointments into open time slots based on user criteria. Thus, this system is arranged to contact individuals one at a time and provide them with choices for rescheduling appointments.

U.S. Pat. No. 6,016,478 teaches an electronic personal information manager which permits peer-to-peer group scheduling. Thus, this system is arranged to schedule a meeting to be attended by several individuals.

U.S. Pat. No. 6,104,788 teaches a system enabling a user to remotely access an electronic calendar. However, the system is for a single calendar and a single user.

SUMMARY OF THE INVENTION

According to a first aspect of the invention, there is provided a scheduling system comprising:
- a telephone interface for making outgoing calls or faxes and receiving incoming calls;
- an internet interface for accepting incoming email or postings and for sending out emails or modifying web pages;
- a memory for storing a plurality of calendars;
- a comptroller interface for to reporting time spent on call by the specialists to the comptroller for billing purposes;
- an administrator interface for reporting changes or amendments to the schedules;
- an engine for instructing the telephone interface and the internet interface to send out notification of changes in schedules and bills; and
- a voice synthesizer or phrase bank for prompting incoming calls or outgoing calls.

BRIEF DESCRIPTION OF THE DRAWINGS

FIG. 1 is a schematic diagram of the components of the scheduling system.

DESCRIPTION OF THE PREFERRED EMBODIMENTS

Unless defined otherwise, all technical terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

Described herein is a system for and a method of establishing and disseminating a plurality of schedules having multiple users and providing information from said schedules to a plurality of users. The system will now be described by way of example, although it is to be understood that the example is for illustrative purposes only and the invention is not limited to the example.

In one example, the system is arranged for establishing and disseminating the schedules of specialists on call within a metropolitan area or within a specific health plan or hospital group. As will be appreciated by one knowledgeable in the art, each hospital requires a plurality of specialists, for example, but by no means limited to, anaesthetists, radiologists, cardiologists, plastic surgeons and the like. Co-ordinating the schedules of all these specialists and reporting any changes to the respective hospital is critical for the functioning of the health care system, but is also arduous and time consuming. Herein described however is a system which allows the specialists to enter in their schedules themselves. The updated schedules are then immediately available to the respective hospitals. The system also allows more accurate tracking of calls placed and therefore facilitates billing. Finally, the system is arranged to automatically ensure that someone is on call during the required times.

In the exemplary example, the system comprises a control unit having a telephone interface, an internet interface, an administrator interface, a comptroller interface, a memory, an engine and a voice synthesizer.

The telephone interface is arranged to make outgoing calls or faxes or receive incoming calls, as described below.

The internet interface is arranged to accept incoming email or postings and to send out emails or modify and/or update web pages, as discussed below.

The memory is arranged to store a plurality of calendars.

The comptroller interface is arranged to record and report time spent on call by the specialists to the comptroller for billing purposes, as described below.

The administrator interface is arranged to report changes or amendments to the schedules to the administrator as they are made, as described below.

The engine is arranged to instruct the telephone interface and the internet interface to send out notification of changes in schedules and bills, as discussed below.

The voice synthesizer or phrase bank is arranged to prompt incoming calls or outgoing calls, as discussed below.

In the instant example, the system operates as follows: a user accesses the system by telephoning the control unit. Once connected to the control unit via the telephone interface, the voice synthesiser prompts the user to enter an identification code which identifies both the specific user and the schedule to be accessed. The control unit then prompts the user via the voice synthesiser to enter the dates and times he or she will be on call. As will be appreciated by one knowledgeable in the art, this may be done by direct entry of dates and times using the telephone keypad or by selecting (or agreeing to) dates and times from a menu. The user may also confirm the schedule over the telephone, either when finished entering their schedule or by calling at a later date. In some embodiments, a copy of the schedule may be faxed to the user by the control unit for confirmation.

Ideally, each user contacts the control system with their specific schedule, thereby completing the schedules. In the event that a user does not enter their schedule into the system by a specific deadline, the control system is arranged to contact the individual user as well as the administrator and notifies them that there is a problem. Furthermore, if there are time periods not covered by a specialist, the engine directs the administrator interface to notify the administrator that steps must be taken. In some embodiments, the engine may analyze the schedules to determine if specific users have not entered enough on call time or have entered too many hours.

In the event that changes must be made to the schedule, the control system allows the user to access it and make changes to the schedule, specifically by entering the user number of the individual who will be taking their shift. In some embodiments, the control system may contact the replacement to ensure that this correction is indeed correct.

Thus, the system ensures that all designated time periods are covered by someone on call. In some embodiments, the system may include more than one person on call or may include secondary contacts in case of emergency or in the event that the primary physician is unavailable. Furthermore, as discussed above, all changes to schedules can be faxed or emailed to the respective hospitals or posted on web pages for access by the hospitals.

In use, the control unit makes all of the schedules accessible to the individual hospitals so that each hospital is aware of what specialists are on call at what specific times. This may be by, for example, faxing or internet posting. In some embodiments, calls to the specialist are directed through the control unit which then notifies the specialist that a call has been placed and also automatically notifies the other hospitals where the specialist is by way of web posting or faxing.

In some embodiments, 30 minutes prior to beginning a shift, the specialist contacts the control unit notifying that he is prepared to go on duty. The control unit allows for overlap by two users during the last half hour of the shift and the first half hour of the next shift. The specialist currently on call will sign off during this overlap period. If the first specialist attempts to sign off when the second specialist has not yet logged on, the control unit will alert the first specialist that no one else has signed on. The first specialist will then be able to either sign off or continue their shift. Regardless of the choice made by the first specialist, the control unit will then contact both the administrator and the second specialist and will notify them that there is a problem. As a result of this arrangement, there is a specialist on call at all times.

In the embodiment discussed above, wherein calls are placed through the control unit, the administrator has a record of when each specialist came on duty and what calls if any they responded to. This information is reported to them automatically by the control unit which also provides the administrator with a bill for the specialist services. In this manner, billing and time tracking is automated.

While the preferred embodiments of the invention have been described above, it will be recognized and understood that various modifications may be made what specific times. This may be by, for example, faxing or internet posting. In some embodiments, calls to the specialist are directed through the control unit which then notifies the specialist that a call has been placed and also automatically notifies the other hospitals where the specialist is by way of web posting or faxing.

In some embodiments, 30 minutes prior to beginning a shift, the specialist contacts the control unit notifying that he is prepared to go on duty. The control unit allows for overlap by two users during the last half hour of the shift and the first half hour of the next shift. The specialist currently on call will sign off during this overlap period. If the first specialist attempts to sign off when the second specialist has not yet logged on, the control unit will alert the first specialist that no one else has signed on. The first specialist will then be able to either sign off or continue their shift. Regardless of the choice made by the first specialist, the control unit will then contact both the administrator and the second specialist and will notify them that there is a problem. As a result of this arrangement, there is a specialist on call at all times.

In the embodiment discussed above, wherein calls are placed through the control unit, the administrator has a record of when each specialist came on duty and what calls if any they responded to. This information is reported to them automatically by the control unit which also provides the administrator with a bill for the specialist services. In this manner, billing and time tracking is automated.

While the preferred embodiments of the invention have been described above, it will be recognized and understood that various modifications may be made therein, and the appended claims are intended to cover all such modifications which may fall within the spirit and scope of the invention.

What is claimed is:

1. A scheduling control system of establishing and disseminating on call schedules of health care specialists to a health care group comprising:

a telephone interface for making outgoing calls or faxes to one of health care group members and the health care specialists and receiving incoming calls from one of the health care group members or the health care specialists;

an Internet interface for accepting incoming email from one of the health care group members and the health care specialists or postings, and for sending out emails to one of the health care group members and the health care specialists or modifying web pages;

a memory for storing a plurality of calendars, each calendar containing information including dates and times entered by corresponding each of the health care specialists;

a comptroller interface for recording and reporting time spent on call by the health care specialists to a comptroller for billing purposes;

an administrator interface for reporting changes or amendments to the schedules to an administrator;

an engine for instructing the telephone interface and the Internet interface to send out notification of changes in schedules and bills; and a voice synthesizer or phrase bank for prompting either one of the health care group members or one of the health care specialists to enter an identification code, dates and times of the one of the health care specialists will be on call when either said one of the health care group members or said one of the health care specialists connects to the scheduling control system by the telephone interface or Internet interface;

wherein the scheduling control system provides each of the health care specialist's schedule to members of the health care group automatically by fax or Internet posting, and the engine reviews and analyzes each of the plurality of calendars and directs the telephone interface or Internet interface to contact each of the health care specialists who have not entered on call times and dates by a deadline, and directs the telephone interface or Internet interface to contact the administrator if there is a problem including one of the following conditions: a particular health care specialist has not entered on call times, a particular health care specialist has entered too much on call time, and time periods on a given calendar are not covered by a particular specialist.

2. The scheduling control system according to claim 1 wherein a first specialist can make changes to a schedule by entering the identification code of a second specialist who will be taking the first specialist's shift.

3. The scheduling control system according to claim 1 including secondary contacts for alternative specialists provided to the members of the health care group in case of emergency.

4. The scheduling control system according to claim 1 including a control unit connecting one of the health care specialist to the scheduling control system immediately prior to said one of the health care specialist going on call to indicate that said one of the health care specialist is prepared to go on call.

5. The scheduling control system according to claim 1 including a control unit connecting one of the health care specialist to the scheduling control system immediately prior to sign off to confirm that a next available specialist is prepared to go on call.

6. The scheduling control system according to claim 5 wherein the engine contacts the administrator when said next available specialist is not prepared to go on call.

* * * * *